(12) United States Patent
Carrasco Vergara

(10) Patent No.: US 10,676,152 B2
(45) Date of Patent: Jun. 9, 2020

(54) BICYCLE CRANK ASSEMBLY

(71) Applicant: Rotor Componentes Tecnologicos, S.L., Ajalvir-Madrid (ES)

(72) Inventor: Pablo Carrasco Vergara, Ajalvir-Madrid (ES)

(73) Assignee: Rotor Componentes Tecnologicos, S.L., Madrid (ES)

( * ) Notice: Subject to any disclaimer, the term of this patent is extended or adjusted under 35 U.S.C. 154(b) by 0 days.

(21) Appl. No.: 16/342,065

(22) PCT Filed: Oct. 18, 2017

(86) PCT No.: PCT/EP2017/025310
§ 371 (c)(1),
(2) Date: Apr. 15, 2019

(87) PCT Pub. No.: WO2018/072889
PCT Pub. Date: Apr. 26, 2018

(65) Prior Publication Data
US 2019/0233051 A1     Aug. 1, 2019

(30) Foreign Application Priority Data

Oct. 20, 2016   (ES) .................................. P201631355

(51) Int. Cl.
*B62M 3/00* (2006.01)
*B62M 9/08* (2006.01)
*B62M 9/00* (2006.01)

(52) U.S. Cl.
CPC .............. *B62M 3/003* (2013.01); *B62M 9/08* (2013.01); *B62M 2009/002* (2013.01)

(58) Field of Classification Search
CPC . B62M 1/36; B62M 1/38; B62M 3/00; B62M 3/003; B62M 3/06;
(Continued)

(56) References Cited

U.S. PATENT DOCUMENTS

2003/0097901 A1   5/2003   Yamanaka
2006/0053962 A1   3/2006   Chiang
(Continued)

FOREIGN PATENT DOCUMENTS

WO       2013/104663 A1     7/2013

*Primary Examiner* — Richard W Ridley
*Assistant Examiner* — Brian J McGovern
(74) *Attorney, Agent, or Firm* — Bay State IP, LLC

(57) ABSTRACT

A bicycle crank assembly with adjustment orientation system for ovoid toothed chainrings comprising a right crank arm (2) provided with a fifth torque transmission profile (211); a shaft (1) provided with a second torque transmission profile (121) which is non-rotatably engaged to said fifth profile (211); and a transmission element (3), for incorporating toothed chainrings, provided with a fourth torque transmission profile (301) to non-rotatably engage with the first torque transmission profile (120) of the shaft (1). So, when combining the N2 angular positions provided by the coupling between the right crank (2) and the shaft (1) with the N1 angular positions provided by the coupling between the transmission element (3) and the shaft (1), Nt different relative angular positions between the right crank (2) and the transmission element (3) are obtained, thus increasing the possible orientations and decreasing the angular increment between consecutive orientations of the crank assembly.

12 Claims, 14 Drawing Sheets

(58) Field of Classification Search
CPC .............. B62M 2003/006; B62M 9/08; B62M 2009/002; F16H 21/14; B62K 19/34; A63B 2022/0611; A63B 2022/0617
See application file for complete search history.

(56) References Cited

U.S. PATENT DOCUMENTS

| | | |
|---|---|---|
| 2006/0103106 A1 | 5/2006 | Schlanger |
| 2006/0211529 A1* | 9/2006 | Vergara .................... B62M 9/08 474/152 |
| 2017/0274960 A1* | 9/2017 | Dubois .................... B62M 3/00 |

* cited by examiner

FIG. 6
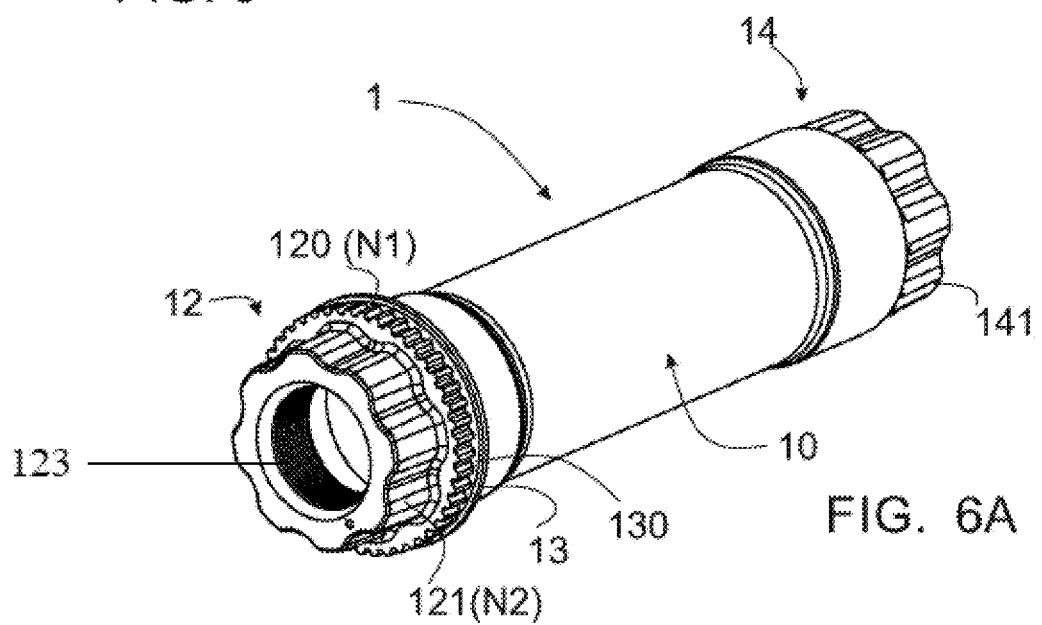
FIG. 6A
FIG. 6B
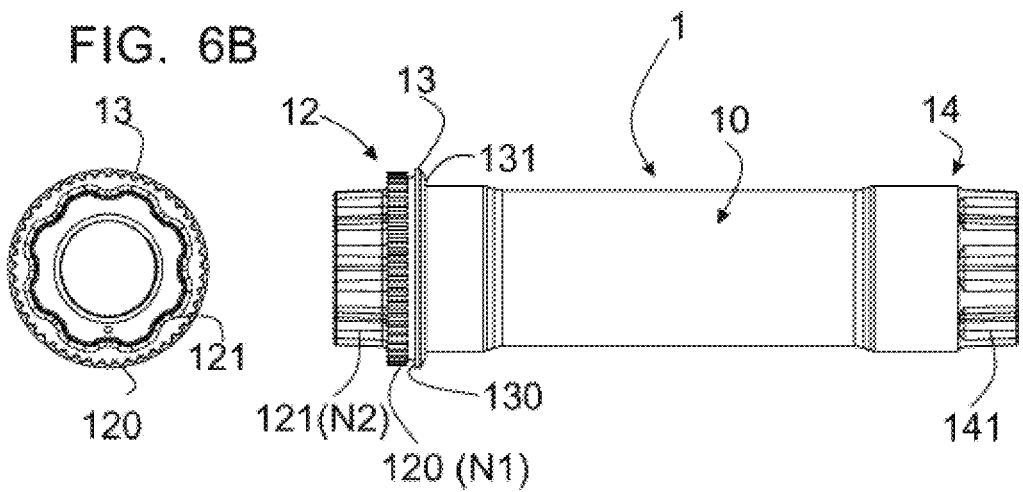

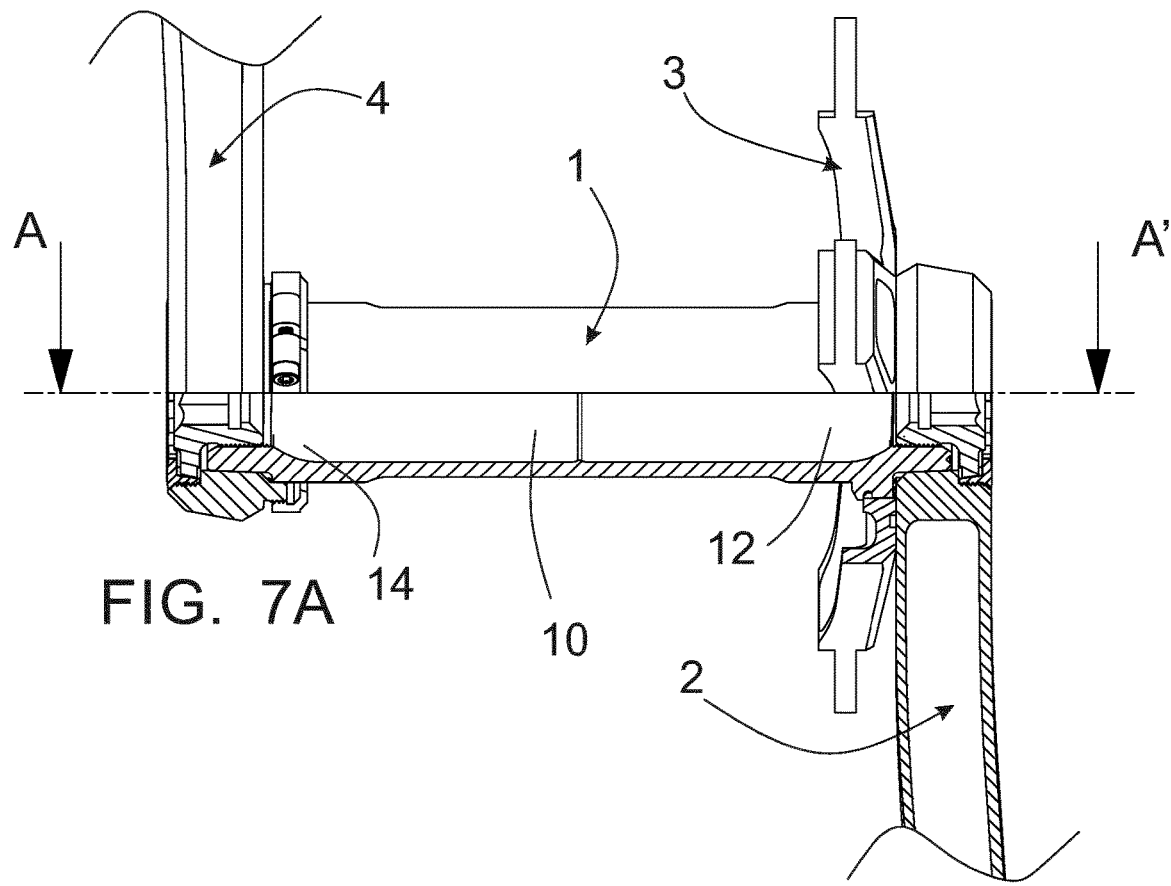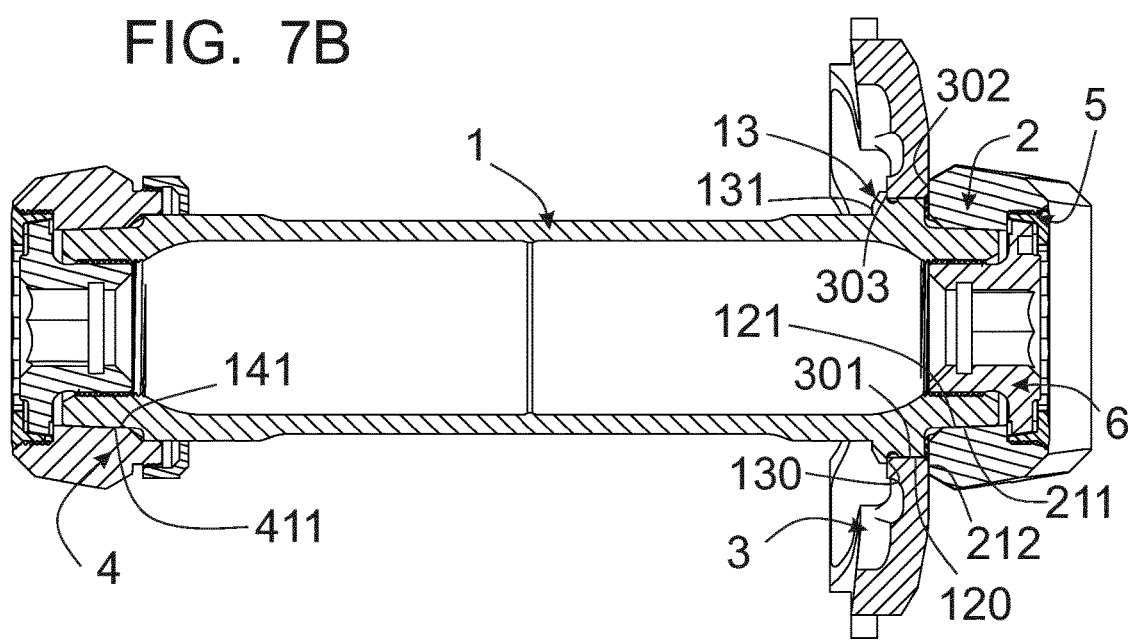

FIG. 8
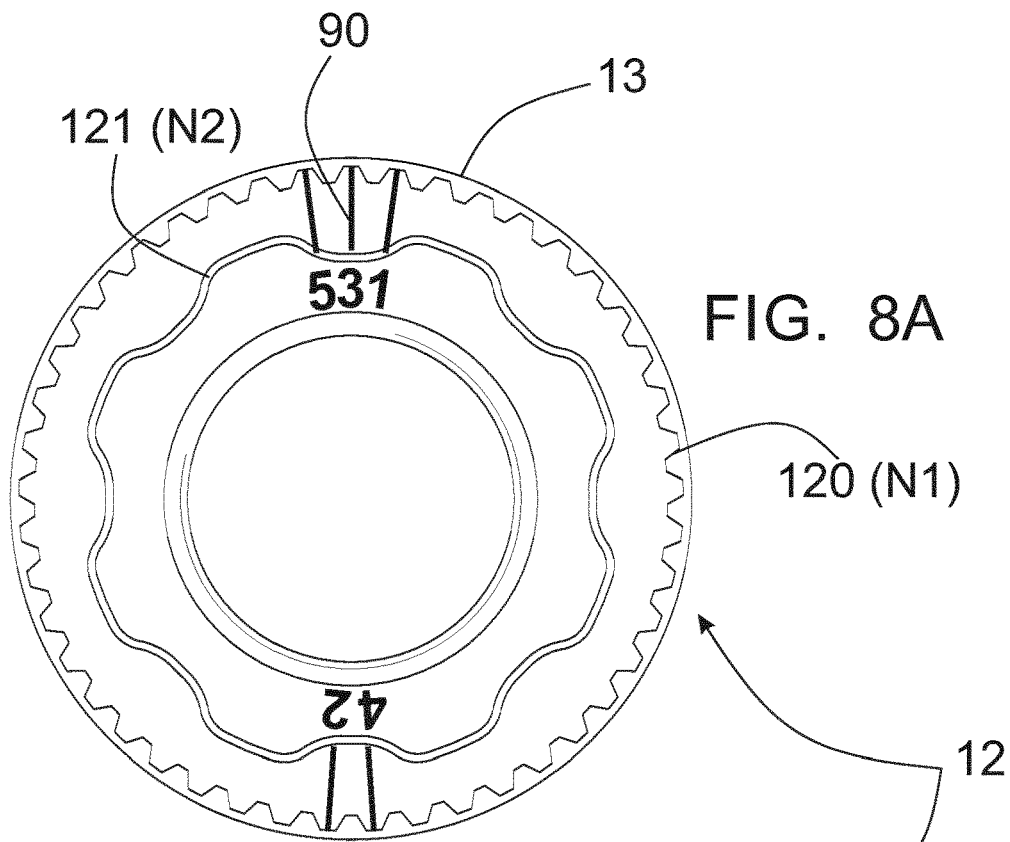
FIG. 8A
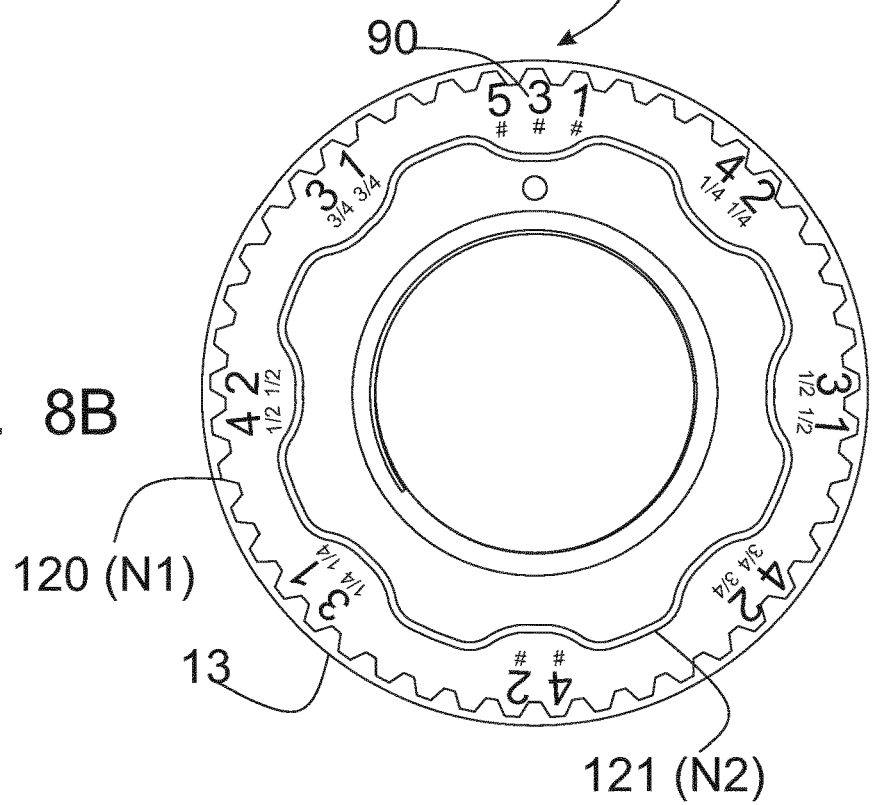
FIG. 8B

FIG. 9
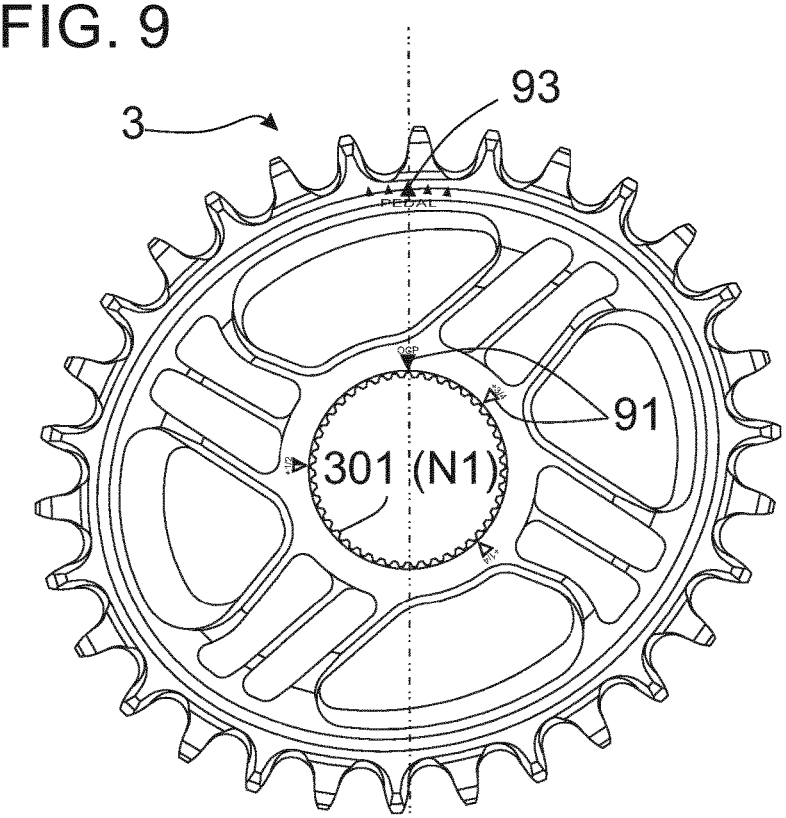
FIG. 9A
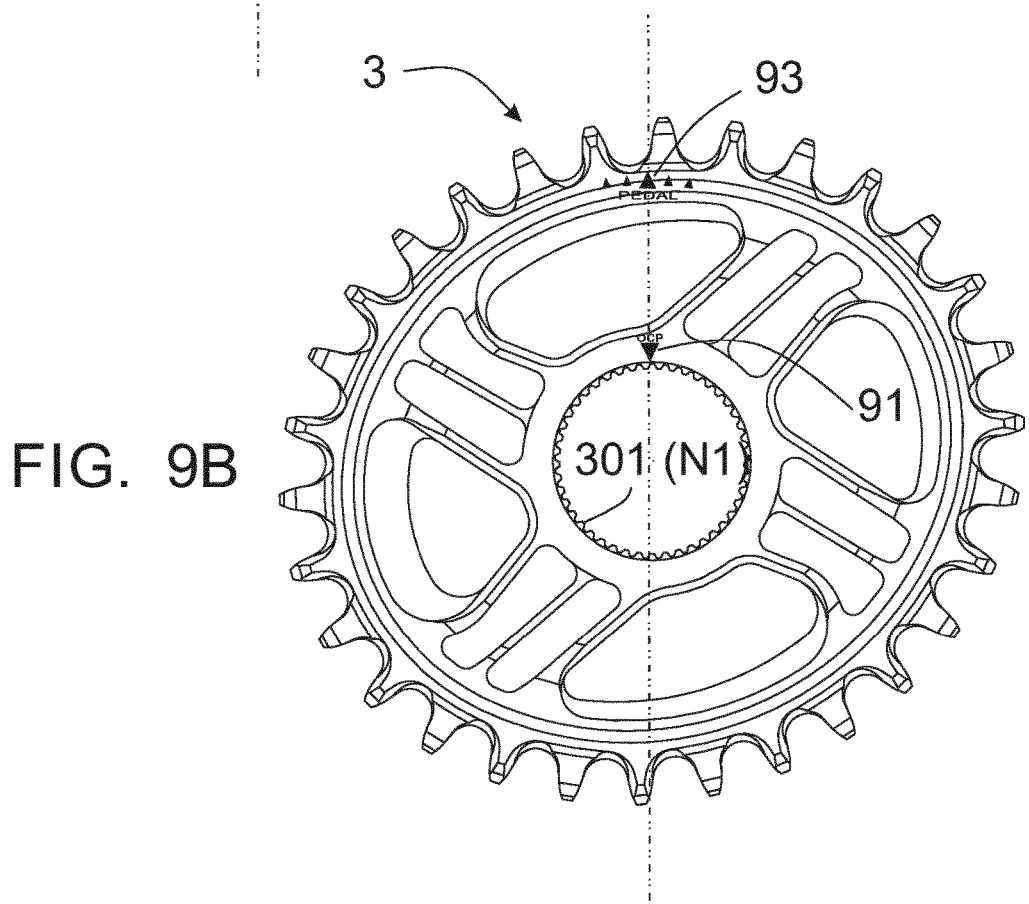
FIG. 9B

FIG. 10
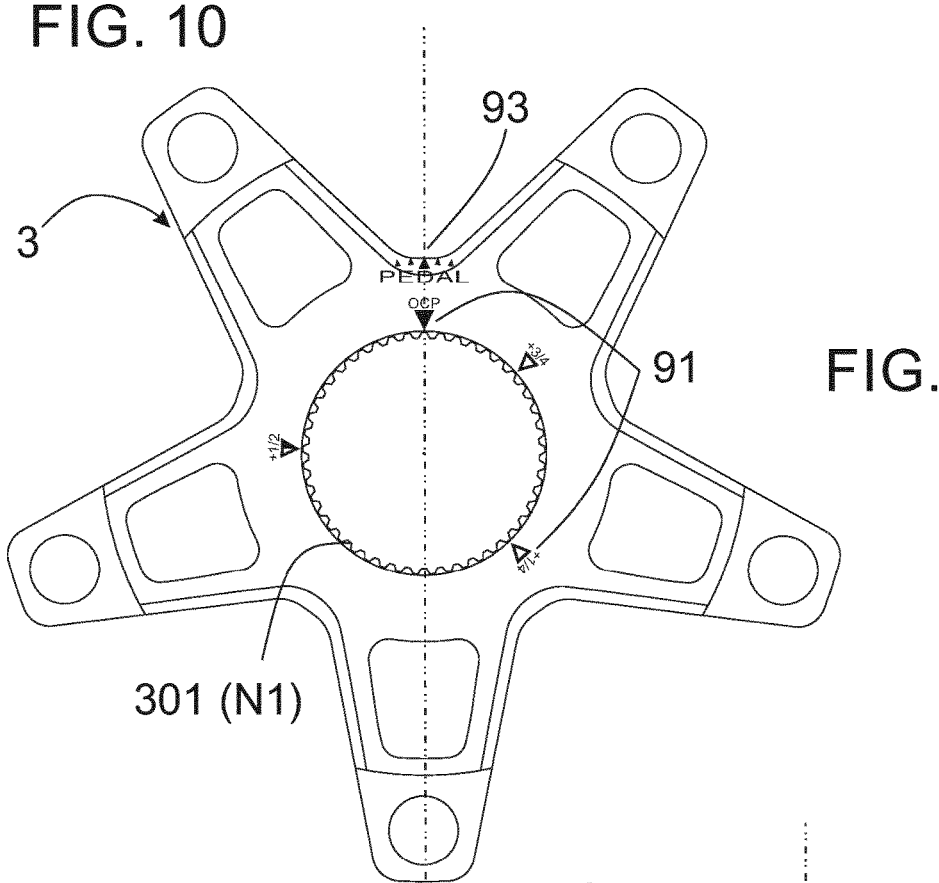
FIG. 10A
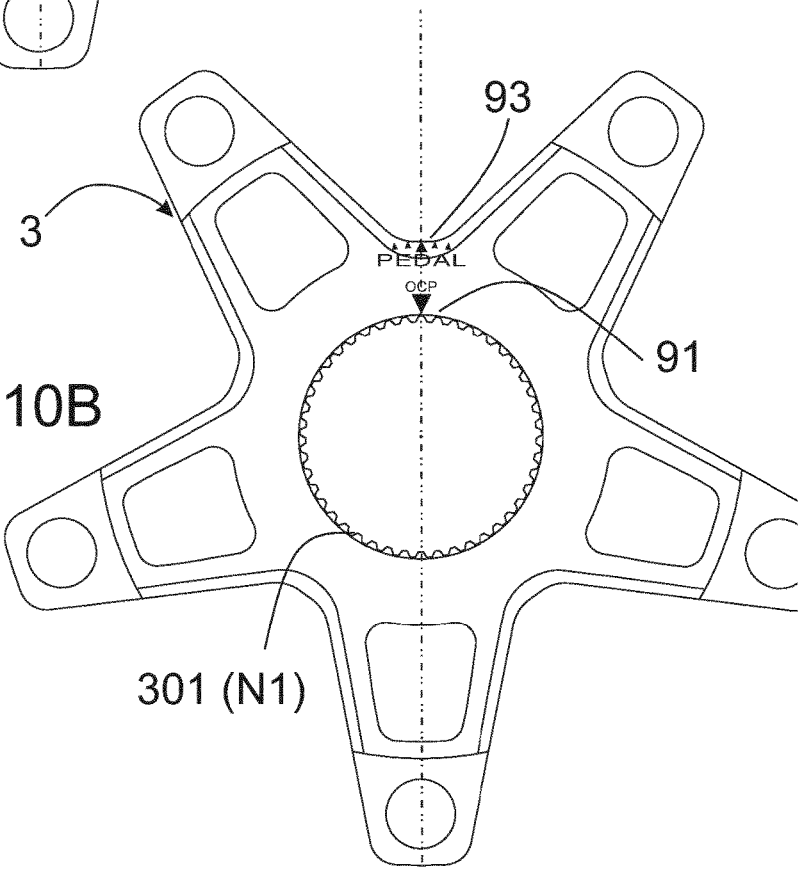
FIG. 10B

FIG. 11
FIG. 11A
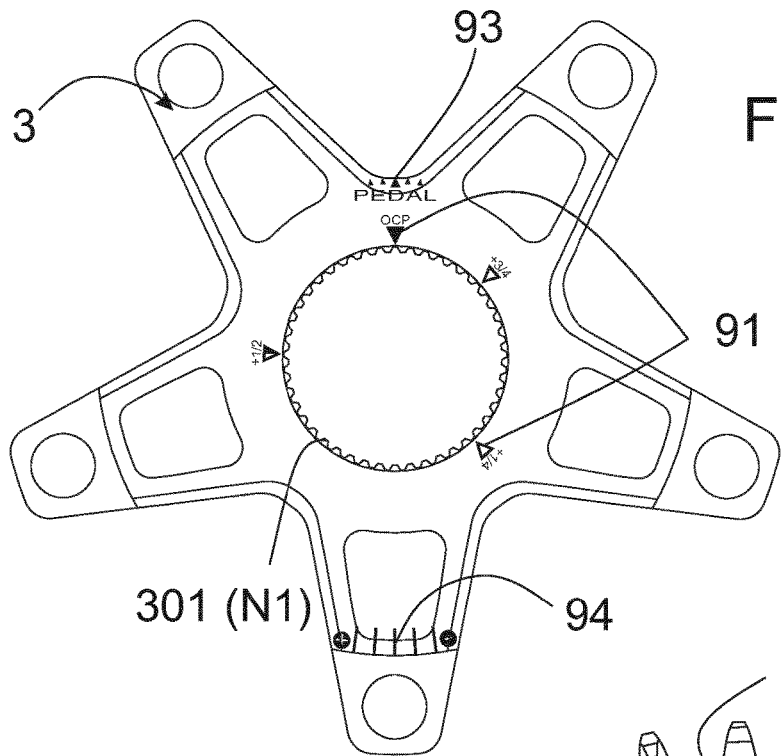
FIG. 11B
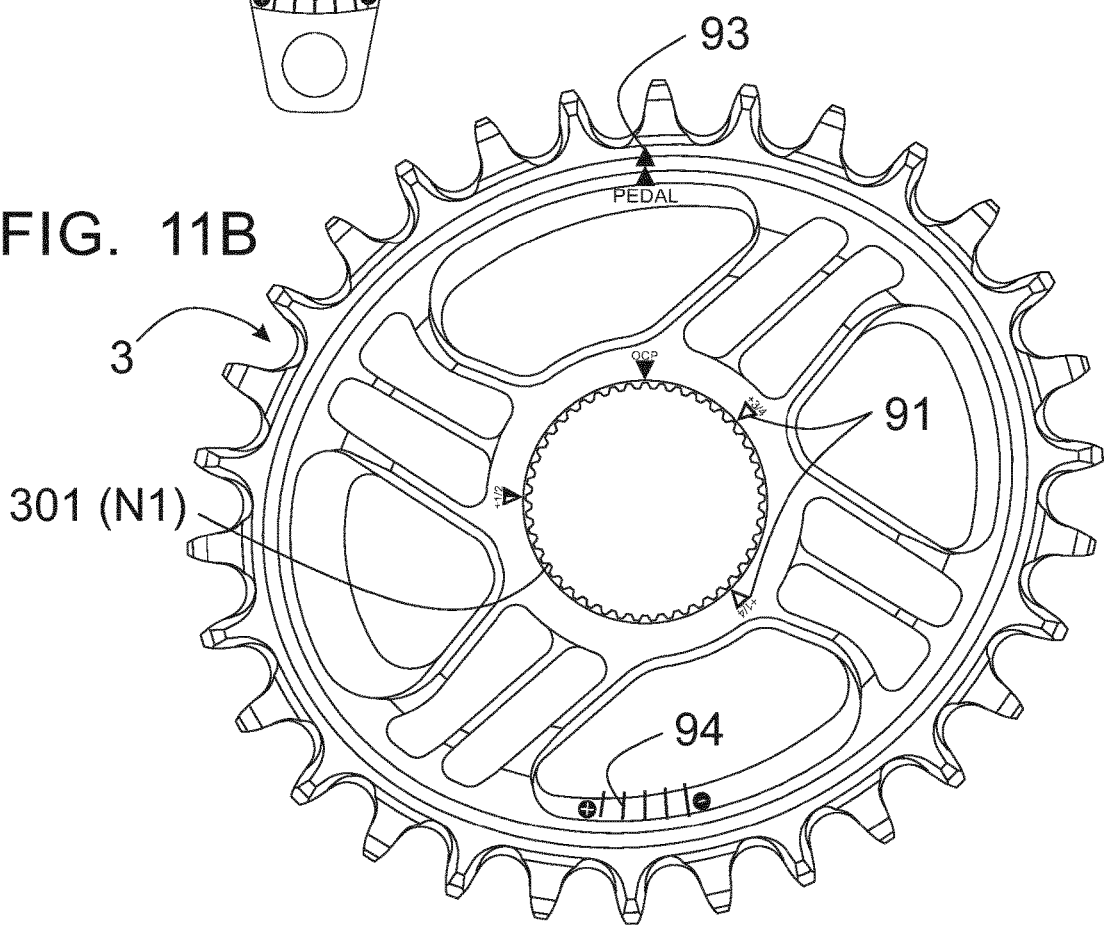

BICYCLE CRANK ASSEMBLY

CROSS REFERENCE TO RELATED APPLICATION

This application is for entry into the U.S. National Phase under § 371 for International Application No. PCT/EP2017/025310 having an international filing date of Oct. 18, 2017, and from which priority is claimed under all applicable sections of Title 35 of the United States Code including, but not limited to, Sections 120, 363, and 365(c) and which in turn claims priority under 35 USC 119 to Spanish Patent Application No. P201631355 filed on Oct. 20, 2016.

The present invention relates generally to a bicycle crank assembly. More specifically, it refers to the assembly of the two crank arms, the crank shaft connecting them and a toothed transmission element for engaging a chain or belt. Said assembly is provided with an adjustment orientation system, which allows to accurately adjust the relative angular position between the crank arm and the transmission element, being very useful in the particular case of transmission elements configured as ovoid toothed chainrings, in which the angular variation of its position optimizes the pedaling biomechanics. In addition, the present crank assembly, allows an assembly and disassembly to the bicycle only accessing from one of the ends of the crank shaft, corresponding to the left crank end, being provided said crank shaft crank at its opposite end with two coupling systems, one for coupling with the crank arm and the other for coupling with the transmission element.

PRIOR ART

A bicycle bottom bracket is a tubular member forming part of a bicycle frame to rotatably mount the crank assembly. The "crank assembly" usually comprises two crank arms, right and left crank arms, each of them being coupled to a pedal in one of its ends. The other end of each crank arm is attached to a shaft which extends through in said bottom bracket. A set of bearings is disposed between the shaft and the bottom bracket, for rotatably supporting the shaft. In addition, the crank assembly is provided with one or more toothed wheels or chainrings, named transmission elements, usually attached to the right crank arm for driving the bicycle chain.

Thus, in the prior art crank assemblies, the torque transmission from the left crank arm is always performed through the crank shaft, but on the right side is the crank arm itself which also transmits to the transmission element, either by means of the direct mounting of one or several toothed chainrings to the crank arm, or by means of an intermediate element, named spider, which in turn may be arranged as an integral part of the crank arm or as an independent element anchored thereto.

As used herein, the term "right" corresponds to the bicycle drive side, where the chain is located, and "left" to the opposite or non-drive side. Likewise, when referring to the elements and their different surfaces in relation to their position with respect to the bicycle frame, the term "inner" corresponds to the side, faces or surfaces facing to the frame of the bicycle, and "outer" corresponds to those that are arranged towards the opposite side, facing the cyclist's legs.

In order to improve the reliability of the bicycle and to simplify the problems associated with the gear changes in the front chainrings, in particular in the most demanding disciplines due to the change of terrain such mountain bike (MTB) and Cyclocross (CX), the current trend is the use of a single front chainring, leaving the responsibility of shifting gears to the rear sprockets.

As a result of this simplification, using a single front chainring provides a great added advantage: the reduction of weight in the bicycle, by eliminating the alternative front chainrings, the front derailleur and its drive controls.

Pursuing this same purpose of weight reduction, the removal of the spider, which is traditionally the intermediate element anchoring the chainring to the crank, has become a very widespread option and therefore using the direct coupling between both elements known in the sector as "Direct Mount".

However, in a bicycle with a single chainring, this chainring needs to be easily changed by the user, both for adapting the bicycle to the different configurations of the circuit or terrain (being able to choose between chainrings with different numbers of teeth), and for replacing the chainring due to a harder wear. This replacement of the chainring, although is very simple in the case of a crank arm with a coupled spider, in the case of Direct Mount when eliminating this intermediate element to reduce weight, a new technical problem appears corresponding to the direct coupling of the chainring to the crank arm by a system provided with a quick and simple assembly and disassembly.

In the known prior art, the systems used in these Direct Mount assemblies to connect the crank to the chainring are the same traditional fastening systems that connect the spider to the crank. An example of this is the Shimano document EP0909696 (1995) which discloses anchorage means coupling the chainring to the crank, combining elements provided with perimetrally toothed profiles for tangential drag with nut-screw elements for axial fixation. This axial fixation system requires the use of specific tools and has usually to be done in a workshop, thus moving away from the desired simplicity in the crank assembly.

Therefore, part of the problem to solve is a Direct Mounting system that can be performed easily and quickly by the final user, in any situation and without added tools, for example at the beginning of a cycling race.

Shimano U.S. Pat. No. 4,331,043A (1979) is the closest document to the present invention, disclosing an assembly provided with a shaft independently coupled to the transmission element and to the crank, being this latter assembly eccentrically thus allowing to choose between different effective lengths of the crank, by varying the relative position between the shaft and the crank, but without affecting the position of the transmission element. Both, the crank arm and the transmission element are axially fixed on the inner side by a protrusion arranged in said shaft, so that an inner face of the transmission element leans against the protrusion. On the outer side, both the crank arm and the transmission element are axially fixed by means of a single threaded screw mounted in the end of the shaft, so that the head of the screw is supported against an outer surface of the crank arm.

These prior art known methods for crank assemblies do not allow adjusting the angular position of the transmission element, arranged as a chainring or as a spider, relative to the crank. This is due to the fact that this technical need is the result of using an ovoid toothed chainring as part of the transmission element, which is the one that provides a biomechanical benefit to the user with this angular adjustment, either by improving sports performance or by reducing the knee joint effort, which is an important benefit especially in case of cyclists with knee problems. In this case, an orientation parameter is defined as the angle measured in the pedaling direction, between a larger diameter of the ovoid toothed chainring and the plane containing the cranks.

Documents showing regulation systems allowing to choose between different orientations for an ovoid toothed chainring and belonging to the present applicant are the following: US2006211529, US2013281239, and US2015000460. In these documents, it is achieved the increment of the number of potential different angular positions for coupling the crank arm and the ovoid toothed chainring, and therefore the reduction of the angular increment between two consecutive orientations. To this end, the transmission element which is composed of a spider and one or more ovoid toothed chainrings, is provided with a multiplicity of optional anchorage points in order to allow alternative angular fixing positions by means of screws. However, this solution in its multiple variants is biomechanically limited by the minimum angle achieved between consecutive angular orientations, due to the elements' strength, because when reducing this angular increment the overlapping between adjacent anchorage points or holes is produced; and on the other hand, it can be a complex system in terms of using, when combining the different composing elements, that is to say chainring, spider and screws, to achieve the angular orientation required by the user.

In document U.S. Pat. No. 9,108,699A is also disclosed a system for regulating angular orientations (wherein the user can choose the angle between the main axis of said ovoid chainring and the plane containing both crank arms, after assembling the crank assembly), in which there are combined two different scales arranged in the transmission element: a primary or main scale in the toothed chainring and a secondary scale, in the spider or support element, that is able to rotate relative to the main scale, thus multiplying the number of different chainring angular positions and reducing the angular increment between consecutive orientations. In this way, a finer and more precise adjustment is allowed by combining the divisions of the primary scale determined by the anchorage points in the toothed chainring with the secondary scale determined by the anchorage points in the spider, thus multiplying the number of different angular positions that each scale allows separately. However, this solution has a structural minimum limit of 2° between consecutive orientations, limited by the distance between the holes arranged as anchorage points, in order to maintain the required strength and rigidity functions at said anchorage points. In addition, it is a substantial weight increase for the whole assembly.

Thus, it is desirable to reduce the minimum limit of 2° between consecutive orientations in order to optimize the biomechanics of pedaling, but using a solution that reduces the complexity of the system in both cases: when assembling and using, furthermore allowing the user to choose and fix a customized angular position for the optimization of its particular pedaling in an easy way, and also achieving the greatest possible weight reduction in the whole assembly by eliminating intermediate anchorage elements.

Therefore, the present application solves these and other disadvantages, as described below, by providing an adjustment orientation system for crank assemblies by means of specific torque transmission profiles arranged in their component elements, specifically in the corresponding coupling portions of these elements; and also providing a scale-marked on said crank assembly elements, in order to enable the user to simply choose their customized angular orientation.

SUMMARY OF THE INVENTION

An object of the present invention is a bicycle crank assembly with adjustment orientation system, wherein the torque transmission is performed from each crank arm exclusively towards the shaft, and the shaft is in charge of transmitting torque towards the transmission element, which incorporates a toothed chainring driving the bicycle chain. In this case, both coupling: one between the crank arm and the crank shaft, and the other between the transmission element and the shaft, is carried out directly by means of corresponding torque transmission profiles arranged in the coupling portions between the crank arm and the shaft, and between the shaft and the transmission element.

This invention further relates to a bicycle crank assembly with adjustment orientation system for ovoid toothed chainrings, comprising a crank shaft, a right crank arm and a left crank arm both supported at the opposite ends of said shaft, and a transmission element, for incorporating at least one ovoid toothed chainring, supported at the end of said shaft corresponding to the right crank arm and at the inner side thereof.

Thus, the shaft comprises at its two ends, two coupling and torque transmission profiles that prevent relative rotation between both crank arms and shaft; it also comprises a torque transmission and coupling profile configured at one of the two ends of the shaft for coupling said transmission element. These transmission profiles are preferably configured as patterns circularly and outwardly arranged with recesses and protrusions for engaging with the corresponding profiles arranged in the coupled elements.

Said crank arms have elongate bodies with a coupling portion for the pedal at one end and another coupling portion for the shaft at the other end, which is provided with a coupling and torque transmission profile to engage with the respective profile in the shaft.

Said transmission element likewise has a coupling portion provided with a coupling and torque transmission profile for engaging with the corresponding shaft profile.

In the present crank assembly, the mounts for both crank arms and for the transmission element are coaxially arranged with the rotation axis of said crank shaft.

It is a further object of the present invention to fix the axial position of the transmission element on the shaft by a radially projecting member outwardly configured on said shaft, which prevents the transmission element from moving axially towards the bicycle frame. Likewise, said projecting member prevents the axial displacement of the shaft itself towards the bicycle frame. Therefore, that allows to make independent two different mounting operations: the shaft mounting in the bicycle frame and the transmission element mounting on the shaft. The first mounting is performed by inserting the shaft into the bottom bracket on the right side of the bicycle until said projecting member abuts against the bottom bracket, so the shaft keeps axially restricted once the left crank is assembled. The second mounting is carried out on the right side of the shaft, coupling the transmission element and then the right crank arm connecting the shaft directly and simply, whereby the transmission element keeps axially delimited between the shaft projecting member and the right crank arm.

This configuration is particularly advantageous in an using mode which begins to be extended in cycling for reducing problems related to the front gearshift, when the transmission element is a single piece with a toothed chainring integrated therein, without a spider or intermediate element, thus allowing the axial fixing of the transmission element without using any of the conventional means, which are usually fixed anchorage points (by nut or screw) from the chainring to the crank arm.

Another object of the present invention is a bicycle crank assembly provided with adjustment orientation system for ovoid toothed chainrings, which allows to increase the number of potential different angular positions between crank arm and transmission element, minimizing the angular increment between consecutive angular positions, preferably from degree to degree, and thus offering a customized position to any cyclist, in a simple way. This is achieved by combining the different angular positions that allows the coupling between the transmission element and the shaft, with the different angular positions that allows the coupling between the right crank and the shaft.

In this particular case of ovoid toothed chainrings, the angular orientation can be modified by removing the right crank and then the transmission element, changing the angular coupling position of the transmission element relative to the shaft, and then reassembling the right crank on the shaft with the selected angular orientation (φ) relative to the chainring. Finally, the left crank arm is disassembled and aligned with the right crank arm angular position to maintain the relative position between both in 180°.

Another object of the present invention is to provide said crank assembly with adjustment orientation system, with graduation means. To do this, a graduated scale is marked in its components to make the adjustment of the relative angular position between the right crank arm and the major axis of an ovoid toothed chainring, which is the parameter named "angular orientation" (φ).

In addition to the abovementioned characteristics, the present crank assembly with adjustment orientation system reduces the number of pieces and mounting operations required. As a consequence, the weight of the assembly is also reduced but increasing the structural strength of the system.

BRIEF DESCRIPTION OF DRAWINGS

FIG. 6A-6B respectively show a front and side perspective view of the shaft (1) comprising a first end portion (12) provided with a first torque transmission profile (120) with N1 protrusions and a second torque transmission profile (121) with N2 protrusions; a second end portion (14) with a third torque transmission profile (141); a central body (10); and a projecting member (13) extending radially outwardly.

FIG. 7A-7B show a sectional front view and a section A-A' of the preferred embodiment of FIG. 3, disclosing the contact surfaces and the torque transmission profiles of the coupling portions between the right crank (2), the shaft (1), the left crank (4) and the transmission element (3).

FIG. 8A-8B respectively show two different embodiments of the primary marks (90) made on the shaft (1). In the first one, FIG. 8A, is shown a simplest embodiment of said marks in which only the integer OCP positions are indicated. In the second one, FIG. 8B, is shown a more complex embodiment of said primary marks (90) in which the most common non-integer OCP positions are further indicated.

FIG. 9A-9B respectively show two different embodiments for the marking scales in a transmission element (3) configured integrally in one piece with the toothed chainring. In both embodiments, the secondary marks (91) made in the transmission element (3) are shown, as well as the reference marks (93) which serve to align them with the direction of the right crank (2) longitudinal axis, when coupling the right crank (2) on the shaft. Thus, the more complex embodiment shown in FIG. 9A is corresponding with FIG. 8A, and the simpler embodiment shown in FIG. 9B is corresponding with FIG. 8B, although both combinations gives the same final result.

FIG. 10A-10B respectively show two different embodiments for the marking scales, in a transmission element (3) configured in two different pieces, as a spider coupling a toothed chainring. In both embodiments, the secondary marks (91) made in the transmission element (3) are shown, as well as the reference marks (93) which serve to align with the direction of the right crank (2) longitudinal axis, when coupling the right crank (2) on the shaft. Thus, the more complex embodiment shown in FIG. 10A is corresponding with FIG. 8A, and the simpler embodiment shown in FIG. 10B is corresponding with FIG. 8B, although both combinations gives the same final result.

FIG. 11A-11B respectively show two different embodiments for the verification marks (94), in the case of a transmission element (3) configured as a spider, and in the other case of a transmission element (3) configured in one piece together with the toothed chainring.

PREFERRED EMBODIMENT

Figure 1:
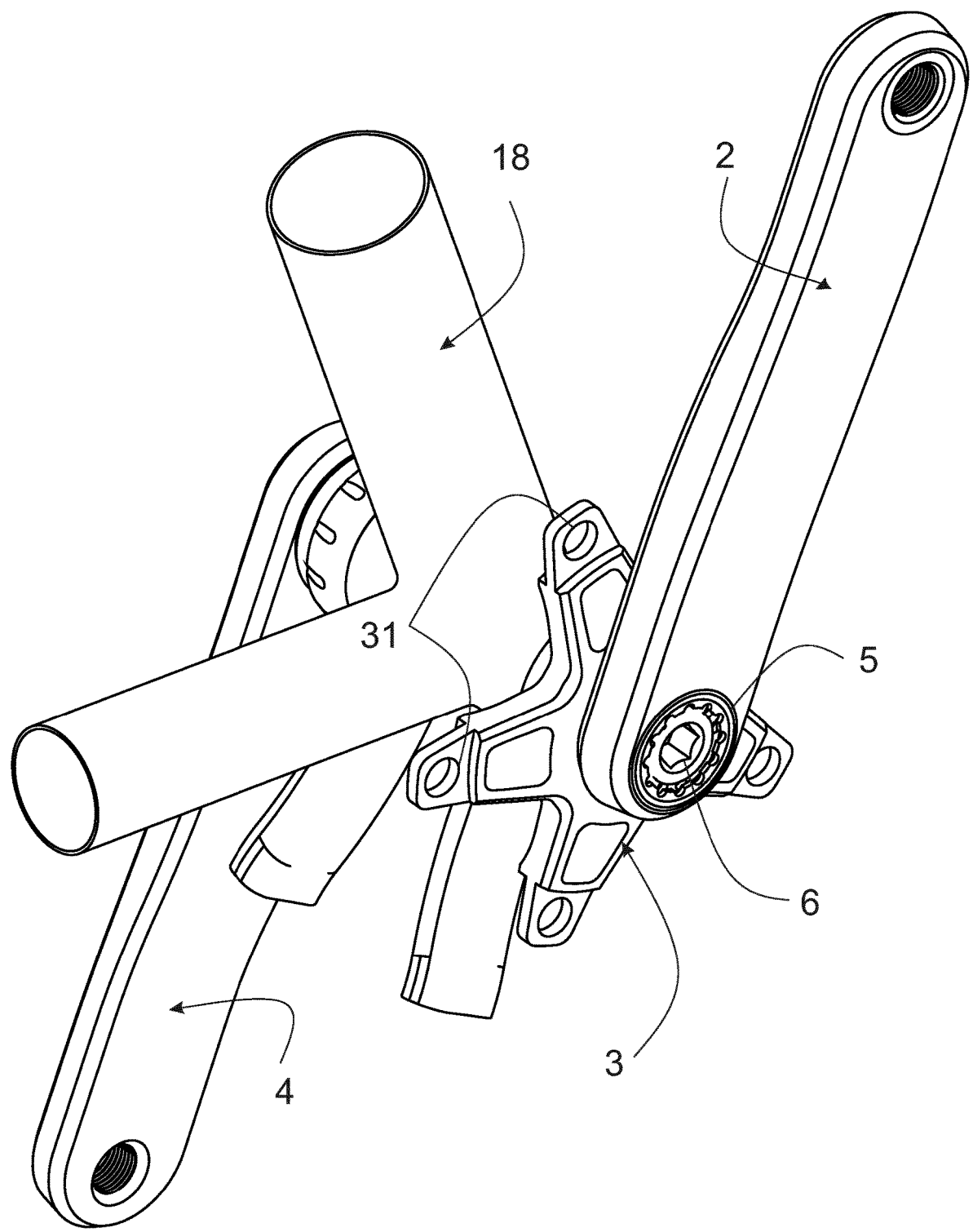
FIG. 1 shows a perspective view of the crank assembly mounted on the bicycle frame (18) where the transmission element (3) is configured as a spider arranged for engaging at least one toothed chainring.
Figure 2:
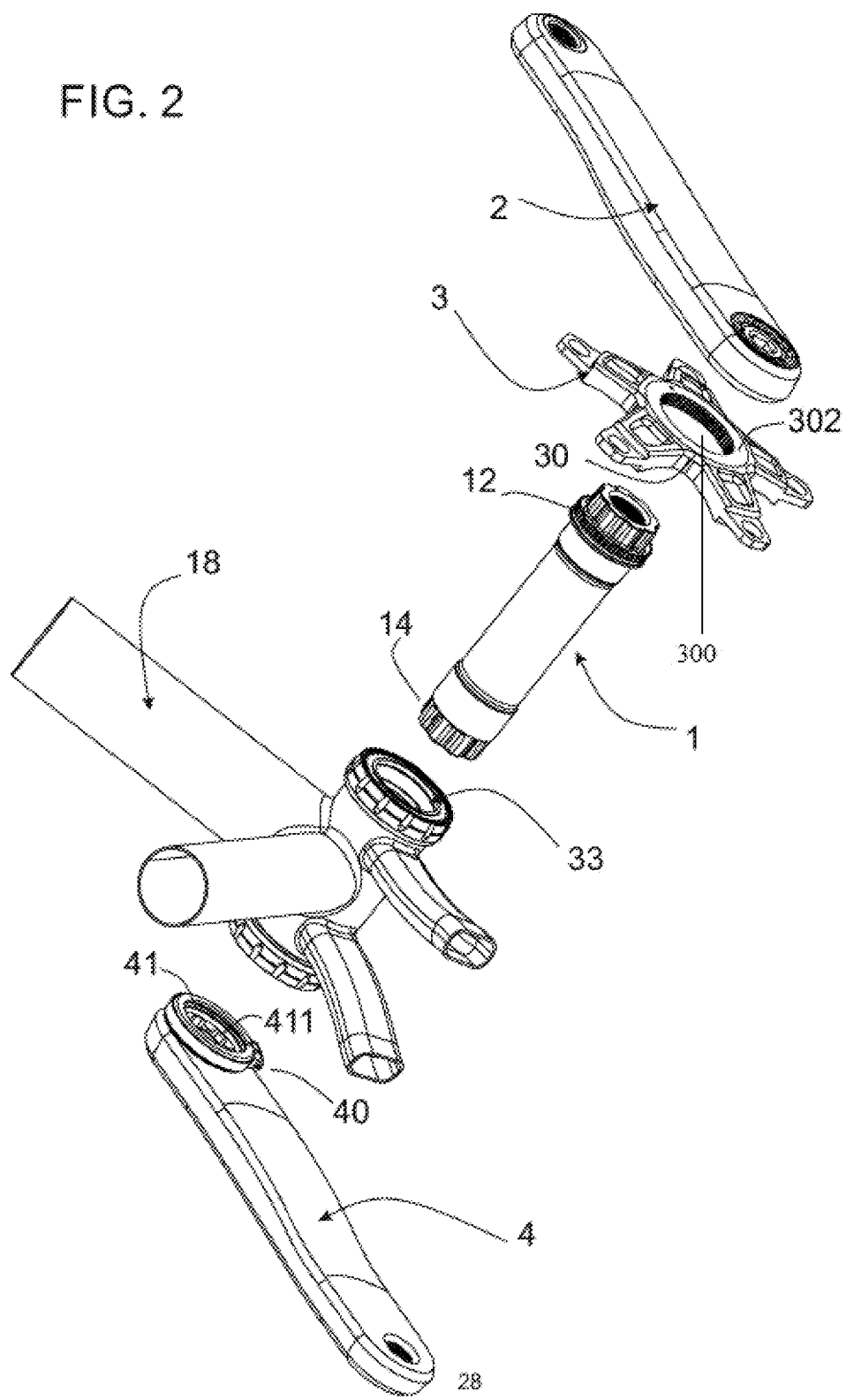
FIG. 2 shows an exploded view of the crank assembly shown in FIG. 1. There are disclosed the bottom bracket (33) located on the bicycle frame (18), the left crank (4), the shaft (1), the transmission element (3) and the right crank (2).
Figure 3:
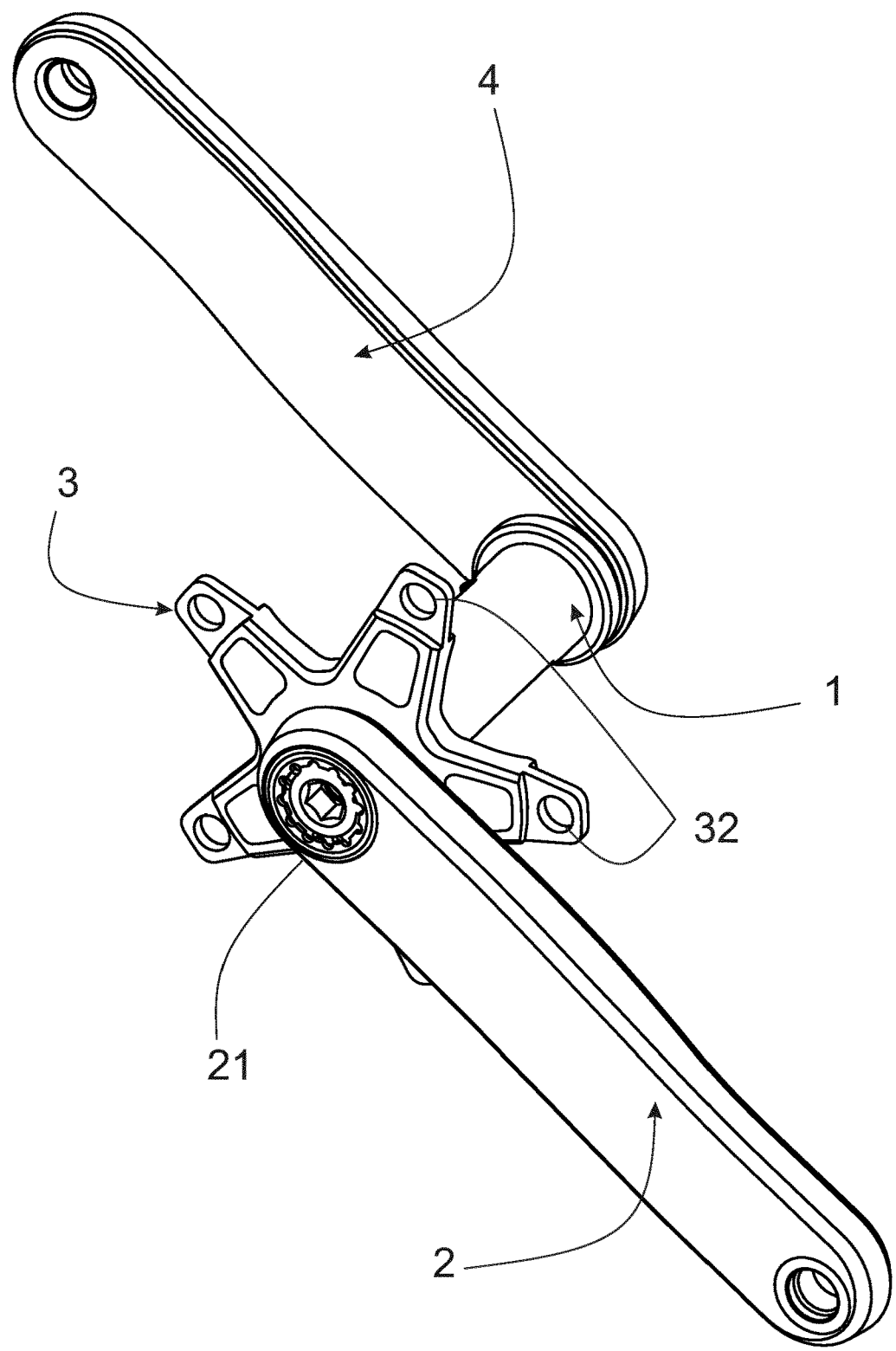
FIG. 3 shows a perspective view of the crank assembly of FIG. 1 mounted without the bicycle frame (18).
Figure 4:
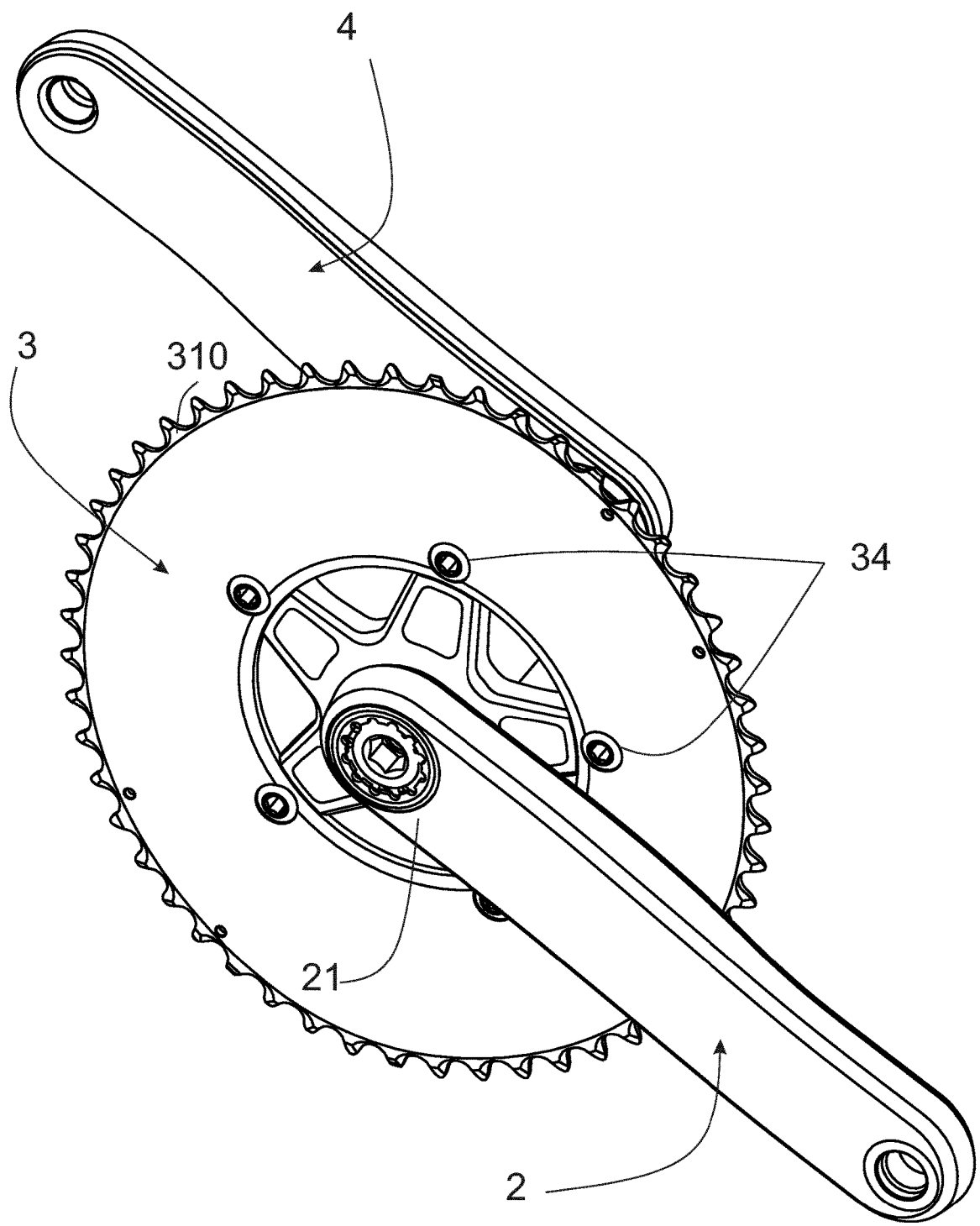
FIG. 4 shows a perspective view of one embodiment of the crank assembly of the invention, wherein the transmission element (3) is configured as a spider having anchorage points (32) for engaging an ovoid toothed chainring (310) by known anchorage means (34) at said anchorage points (32).

In a preferred embodiment of the present invention, it is proposed a bicycle crank assembly with adjustment orientation system, comprising a shaft (1) connecting a right crank arm (2) with a left crank arm (4), and a transmission element (3) which transmits power to the bicycle chain, configured as a spider engaging one or more toothed chainrings, preferably ovoid chainrings, to engage with the bicycle chain, as shown in FIG. 4.

Said transmission element (3) comprises an output coupling portion (31) for non-rotatably coupling at least one ovoid toothed chainring (310) which engages with the bicycle chain. Said ovoid toothed chainring (310) is configured in a different piece apart from said transmission element (3), to which it is attached by known anchorage means (34), usually screws, preferably in one only predetermined angular position with respect to the transmission element (3), causing that a change of orientation in this transmission element (3) produces a corresponding change of orientation in the ovoid toothed chainring (310).

In a preferred embodiment of the present invention, the bicycle crank assembly with adjustment orientation system for ovoid toothed chainrings comprises:

a shaft (1) comprising a first end portion (12), a second end portion (14), and a central body (10) located between both end portions, said central body (10) adapted to be rotatably supported in a bottom bracket (33) in a bicycle frame (18); wherein said central body (10), in its axially adjacent portion to the first end portion (12), comprises a projecting member (13) that extends radially outwardly; wherein said first end portion (12), in its axially adjacent portion to said projecting member (13), comprises a first torque transmission profile (120), and wherein said first end portion (12) further comprises a second torque transmission profile (121); and wherein said second end portion (14) comprises a third torque transmission profile (141);

a transmission element (3), for incorporating at least one toothed chainring for driving the chain, comprising a first coupling portion (30) including a first opening (300) provided with a fourth torque transmission profile (301) to non-rotatably engage with the first torque transmission profile (120) of the shaft (1);

a right crank (2) corresponding to the drive side comprising at one end (20) a second coupling portion (21) provided with a fifth torque transmission profile (211) which is non-rotatably engaged with the second torque transmission profile (121) of the shaft (1);

a left crank (4) corresponding to the non-drive side comprising at one end (40) a third coupling portion (41) provided with a sixth torque transmission profile (411) which is non-rotatably engaged with the third torque transmission profile (141) of the shaft (1); wherein the first, second, third, fourth, fifth and sixth torque transmission profiles (120, 121, 141, 301, 211, 411) are geometrically configured as patterns circularly and outwardly arranged and coaxial with the rotation axis of the shaft (1) which is also coincident with the rotation axis of both right (2) and left (4) crank and also with the rotation axis of the transmission element (3);

wherein the first and fourth torque transmission profiles (120, 301) when engaging define, in the coupling position between the transmission element (3) and the shaft (1), N1 angular positions equally spaced along the whole 360°; wherein the second and fifth torque transmission profiles (121, 211) when engaging define, in the coupling position between the right crank (2) and the shaft (1), N2 angular positions equally spaced along the whole 360°; wherein the third and sixth torque transmission profiles (141, 411) when engaging define, in the coupling position between the left crank (4) and the shaft (1), N2 angular positions equally spaced along the whole 360°; wherein combining the N2 angular positions provided by the coupling between the right crank (2) and the shaft (1) with the N1 positions provided by the coupling between the transmission element (3) and the shaft (1), Nt relative angular positions between the right crank arm (2) and the transmission element (3) are obtained, being Nt the least common multiple of N1 and N2 and being Nt preferably greater than or equal to 45.

Thus, depending on whether Nt is an even or an odd number there are two possible cases:

a) If Nt is an even number, there are two different relative angular positions between the right crank (2) and the transmission element (3), which differ among themselves 180°; and therefore, considering a symmetrical ovoid chainring, both positions correspond to the same value of the angular orientation ($\varphi$) parameter. Because of this, the total number of different orientations N$\varphi$ takes the value N$\varphi$=Nt/2, and the angular increment between two consecutive angular orientations $\Delta\varphi$ takes the value $\Delta\varphi$=180/N$\varphi$=360/Nt.

As an example, for the particular case of N1=45 and N2=8, we have Nt=LCM (45, 8)=360, which as an even number gives a result of N$\varphi$ different orientations wherein N$\varphi$=Nt/2=360/2=180, resulting therefore an angular increment $\Delta\varphi$=180/180=1°.

b) If Nt is an odd number, there are Nt different relative angular positions between the right crank (2) and the transmission element (3), and the total number of different orientations N$\varphi$ takes the value N$\varphi$=NT. Because of this, the angular increment between two consecutive angular orientations $\Delta\varphi$ takes the value $\Delta\varphi$=180/N$\varphi$=180/Nt.

As an example, for the particular case of N1=45 and N2=7, we have Nt=LCM (45, 7)=315, which as an odd number gives a result of N$\varphi$ different positions =315, resulting therefore an angular increment $\Delta\varphi$=180/315=0, 60 when making use of all possible orientations. In this case, the user handling becomes a complex operation as there are consecutive orientations that, in their relative positioning between the transmission element and the right crank, differ among themselves in 179.4°. Therefore, in order to facilitate a good handling, only those corresponding to adjacent relative positions could be selected as operative in one preferred embodiment, thus increasing the angular increment to $\Delta\varphi$=1.2°, as there are available a very large number of possible orientations.

However, in the particular case of Nt=45, it is obtained an angular increment $\Delta\varphi$=4° using all possible angular orientations. In this case, the relative orientations between the transmission element and the right crank that differ among themselves in 176° should be the operative ones in a good handling.

In a preferred embodiment of the invention, in order to simplify handling, as explained above, only the angular orientations corresponding to adjacent relative positions between the transmission element and the right crank are selected to be shown to the user for being selected. Therefore, we use an operational value for the angular increment of $\Delta\varphi$=360/Nt. In addition, only the possible angular orientations in a range of approximately +/−100 in the surroundings of a "middle position" are shown to the user, considering said middle position in the Prior Art as the most usual in each cycling discipline using the present crank assembly.

In a preferred embodiment of the invention, said Nt value is greater than N1 and greater than N2, and preferably N1=45 and N2=8 and therefore Nt=360 and $\Delta\varphi$=1°.

In a preferred embodiment of the invention for using in road cycling, the abovementioned middle position which is the marked position, has a value of $\varphi$=108°.

In a preferred embodiment of the invention for using in mountain bike, for the specific case of a bicycle with 29-inch wheels, said middle position which is the marked position, has a value of φ=113°. For other types of configurations of the bicycle, frame, wheels, etc., the user can also utilize this same crank assembly and take advantage of its adjustment of orientation to adapt it to the customized bicycle geometries.

In a preferred embodiment, in order to facilitate assembling and disassembling of the crank assembly, the axial fixation of the assembly is performed so that the transmission element (3) further comprises a first side surface (302) configured to lean on a lateral surface (212) of the right crank (2), thus avoiding the axial displacement of said right crank (2) towards the second end portion (14) of the shaft (1).

In addition, in order to contribute to the axial fixation of the assembly, the projecting member (13) of the shaft (1) comprises a first axial attachment member (131) that restricts the axial displacement of the shaft (1) in the bottom bracket (33) in the direction towards the second end portion (14) of the shaft (1), and a second axial attachment member (130) which leans against a second side surface (303) of the transmission element (3) to avoid its axial displacement towards the second end portion (14) of the shaft (1).

In a preferred embodiment, the bicycle crank assembly with adjustment orientation system for ovoid toothed chainrings is provided with a first torque transmitting profile (120) in the shaft (1) axially configured by means of radial protrusions and recesses arranged outwardly at the periphery of the shaft for engaging with the corresponding fourth torque transmission profile (301), configured on an inner perimeter surface of the first opening (300) provided in the first coupling portion (30) of the transmission element (3).

Similarly, the second torque transmission profile (121) of the shaft (1) is axially configured by means of radial protrusions and recesses arranged outwardly at the periphery of the shaft for engaging with the corresponding fifth torque transmission profile (211) configured on an inner perimeter surface of the second opening (200) provided in the second coupling portion (21) of the right crank (2).

Likewise, the third torque transmission profile (141) of the shaft (1) is axially configured by radial protrusions and recesses in the outside and at the periphery of the shaft, so it engages to the corresponding sixth torque transmission profile (411) configured on an inner perimeter surface of a third coupling portion (41) of the left crank (4).

In a preferred embodiment of the bicycle crank assembly of the invention, the shaft (1) comprises in its first end portion (12) a first threaded inner peripheral surface (123), and in its second end portion (14) a second threaded inner peripheral surface.

In addition, said second coupling portion (21) of the right crank (2) includes a housing for an axial fixing member (6) which biases said crank arm axially against the first end portion of the shaft, thus fixing its axial position. This axial fixing member (6) has a threaded outer peripheral surface screwed into the first threaded inner peripheral surface (123) of the first end portion (12) of the shaft (1) in order to prevent axial movement of the shaft (1) outwards.

The crank assembly of the invention further comprises a first closure member (5) having a threaded outer peripheral surface screwed into the threaded inner peripheral surface of the right crank (2) in order to close the assembly and to allow the dismantling.

Another object of the present invention is also to use the crank assembly as a graduating instrument including in its components a marked graduated scale for selecting and modifying the relative angular position between the right crank arm and the major axis of an ovoid toothed chainring, either integrally provided or coupled to the transmission element, which is the parameter defined as angular orientation (φ).

To this end, the bicycle crank assembly with adjustment orientation system for engaging with an ovoid toothed chainring comprises primary marks (90) arranged on the shaft (1), secondary marks (91) arranged on the transmission element (3), and reference marks (93) also arranged on the transmission element (3), so when combining them together an angular graduation system is generated, allowing the user to define the desired angular orientation (φ). To this end, firstly the user aligns the secondary marks (91) with the primary marks (90) following the indications corresponding to the selected orientation, thus allowing the engaging of the first torque transmission profile (120) with the fourth torque transmission profile (301) in that selected position, and secondly the user aligns the direction of the longitudinal axis of the right crank (2) with the mentioned reference marks (93), engaging the fifth torque transmission profile (211) of the right crank with the second torque transmission profile (121) of the shaft (1).

In a preferred embodiment the primary marks (90) are configured as numbers associated with the corresponding protrusions of the first transmission profile (120), and the secondary marks (91) are configured as symbols, for example lines or geometrical figures, associated with the recesses of the fourth transmission profile (301), which have to be aligned with the primary marks (90) arranged in the shaft to indicate the different relative positions between the transmission element (3) and the right crank (2), once the right crank is assembled. Similarly, the reference marks (93) are configured as symbols which point to a unique assembly position with the shaft (1), which must to be aligned with the longitudinal axis of the right crank (2) when said right crank is assembled onto the shaft (1).

It is known in the Prior Art the OCP word relative to the biomechanics of pedaling, meaning "Optimum Chainring Position", which represents a using scale of angular orientations. In this scale the intermediate value corresponds with the aforementioned "middle position", defined as the most usual in each cycling discipline using the present crank assembly. Therefore, on an existing numerical scale with 5 possible correlative orientations with Δφ=4°, the OCP3 position would indicate said middle position, OCP1 would indicate the angular position with the smallest value of (φ) and OCP5 would indicate the angular position with the highest value of (φ).

However, the present invention improved this graduation concept allowing a new numerical scale configured for enabling a greater number of possible consecutive orientations decreasing the angular increment between them to Δφ=10°.

As an example for road cycling, optimum angular orientation values are used in the range from 100° to 118°, being 108° the center of that range which is defined as the OCP3 default position. This OCP3 default position is the most usual position for the majority of users, and in any event, it is the first position recommended to be used for novels users of this system, and then it may be varied to more customized positions, until finding the optimal position for each cyclist. In this particular case for road cycling, in order to relate the angular orientation φ with the scale defined in the elements including in the present crank assembly, the following conversion table between φ and the OCP positions corresponding to most usual pedaling positions is given.

| φ (Angular orientation = angle in ° between right crank axis and major axis of ovoid toothed chainring) | OCP Position |
|---|---|
| 100° | 1 |
| 101° | 1 + ¼ |
| 102° | 1 + ½ |
| 103° | 1 + ¾ |
| 104° | 2 |
| 105° | 2 + ¼ |
| 106° | 2 + ½ |
| 107° | 2 + ¾ |
| 108° | 3 |
| 109° | 3 + ¼ |
| 110° | 3 + ½ |
| 111° | 3 + ¾ |
| 112° | 4 |
| 113° | 4 + ¼ |
| 114° | 4 + ½ |
| 115° | 4 + ¾ |
| 116° | 5 |
| 117° | 5 + ¼ |
| 118° | 5 + ½ |

So, once the desired angular orientation for positioning the right crank (2) with respect to the transmission element (3) (configured in a preferred embodiment as a spider with arms (FIG. 10)) is chosen, either by means of the desired φ value or the desired OCP value in the scale, the user acts sequentially as follows to configure the crank assembly of the invention:

Firstly, the user couples the transmission element (3) to the shaft (1), aligning the secondary marks (91) corresponding to the chosen OCP position and marked in the transmission element (3), with the corresponding numbering in the primary marks (90) marked on the shaft (1); so that the first (120) and fourth (301) torque transmission profiles engage in one of the possible N1 different angular positions provided by the combination of said profiles.

Secondly, the user couples the right crank (2) to the shaft (1) which already has the transmission element (3) assembled, positioning the right crank (2) so that the fifth torque transmission profile (211) engages with the second torque transmission profile (121) of the shaft (1) in the corresponding angular position, within the N2 potential positions, which aligns the reference marks (93) with the direction marked by the longitudinal axis of the right crank arm (2) itself, finally obtaining an orientation between the transmission element (3) and the right crank (2) corresponding to the initially required value.

Alternative Embodiments

Figure 5:
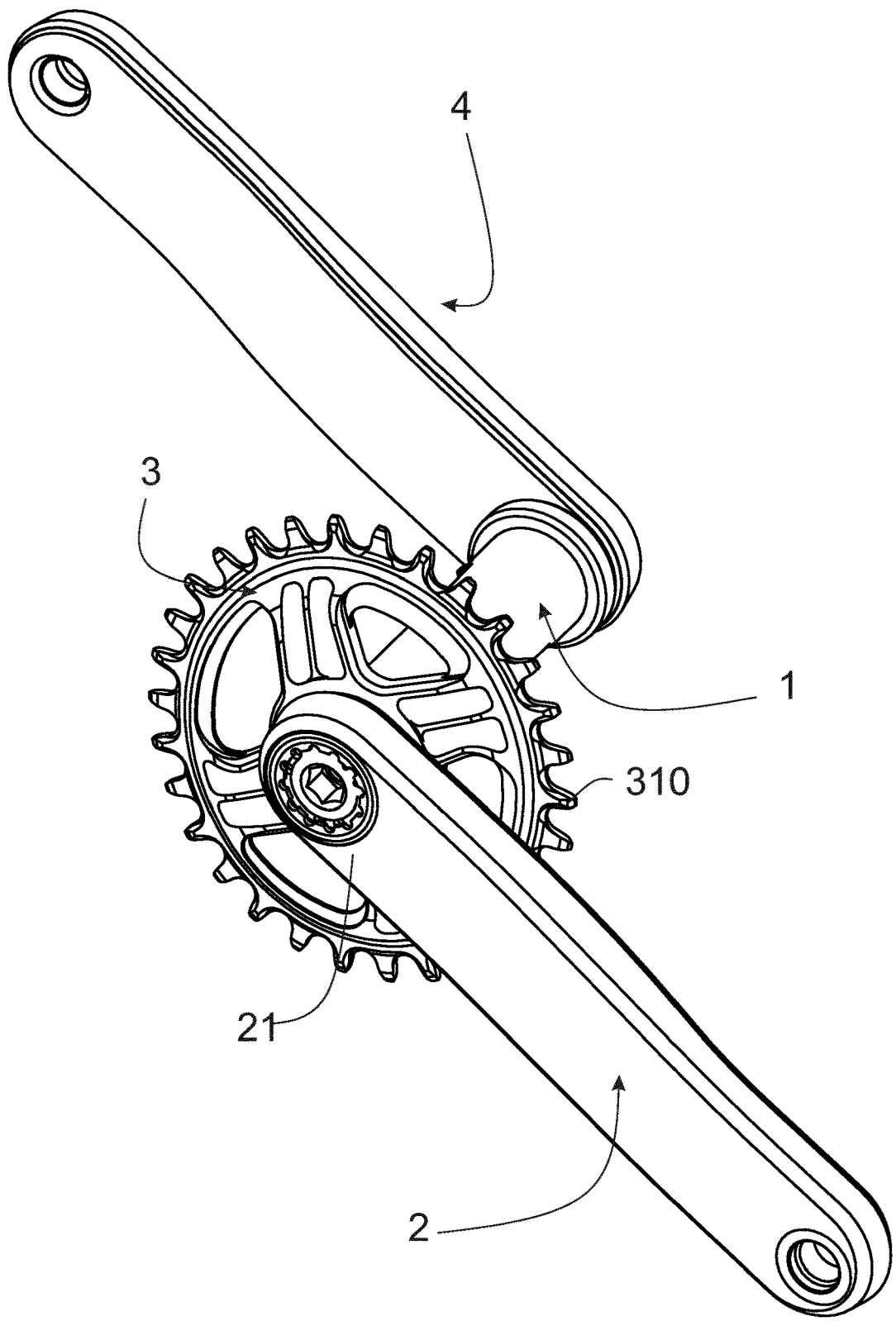
FIG. 5 shows a perspective view of one embodiment of the crank assembly of the invention, showing the right crank (2), the left crank (4), the shaft (1), and the transmission element (3) configured as a single element integrating an ovoid toothed chainring (310).
Figure 12:
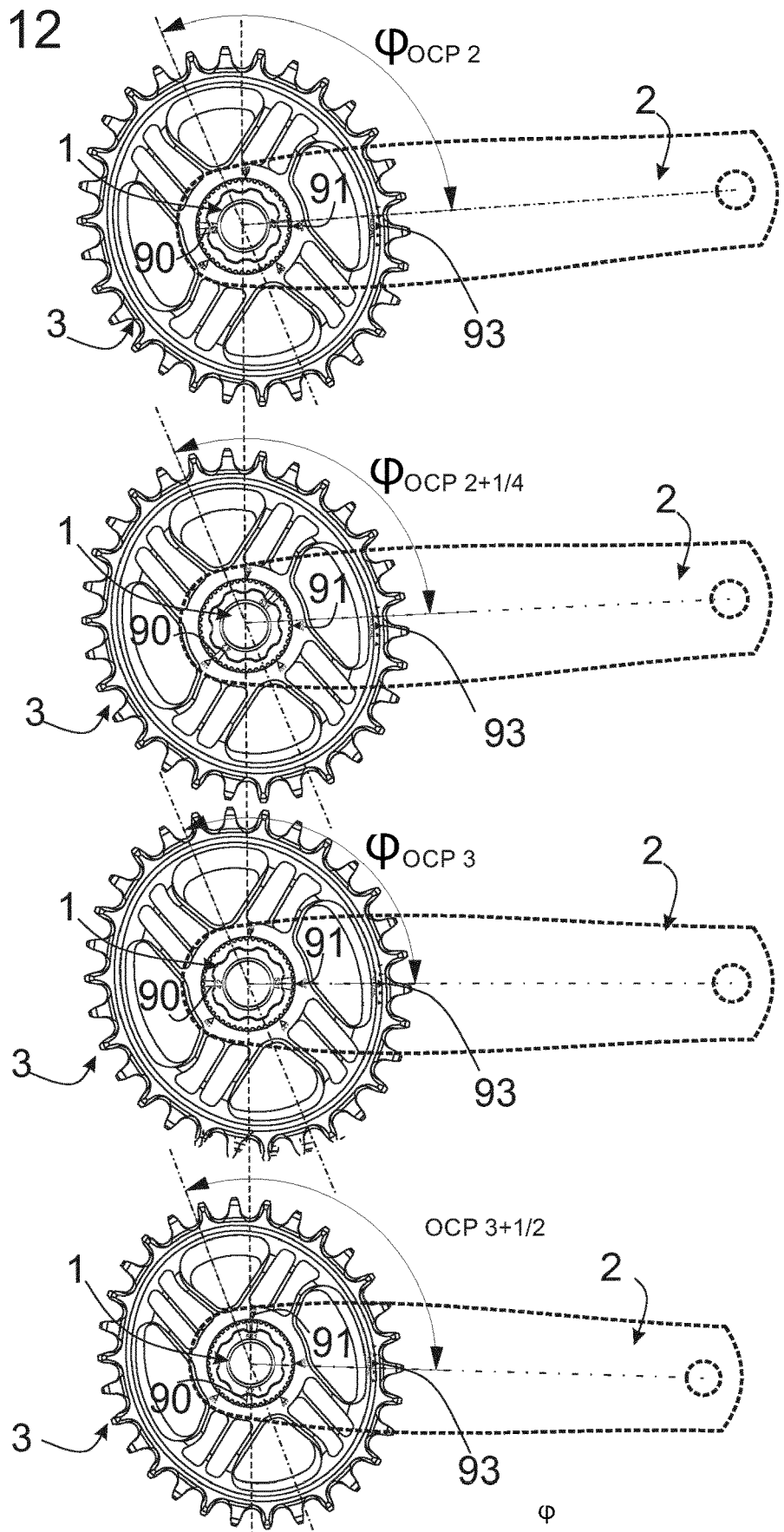
FIG. 12 shows, in a transmission element (3) configured in one piece together with the toothed chainring, different angular orientations (φ), corresponding to different OCP positions, in which the right crank (2), the shaft (1) and the transmission element (3) are engaged in different configurations of the torque transmission profiles.
Figure 13:
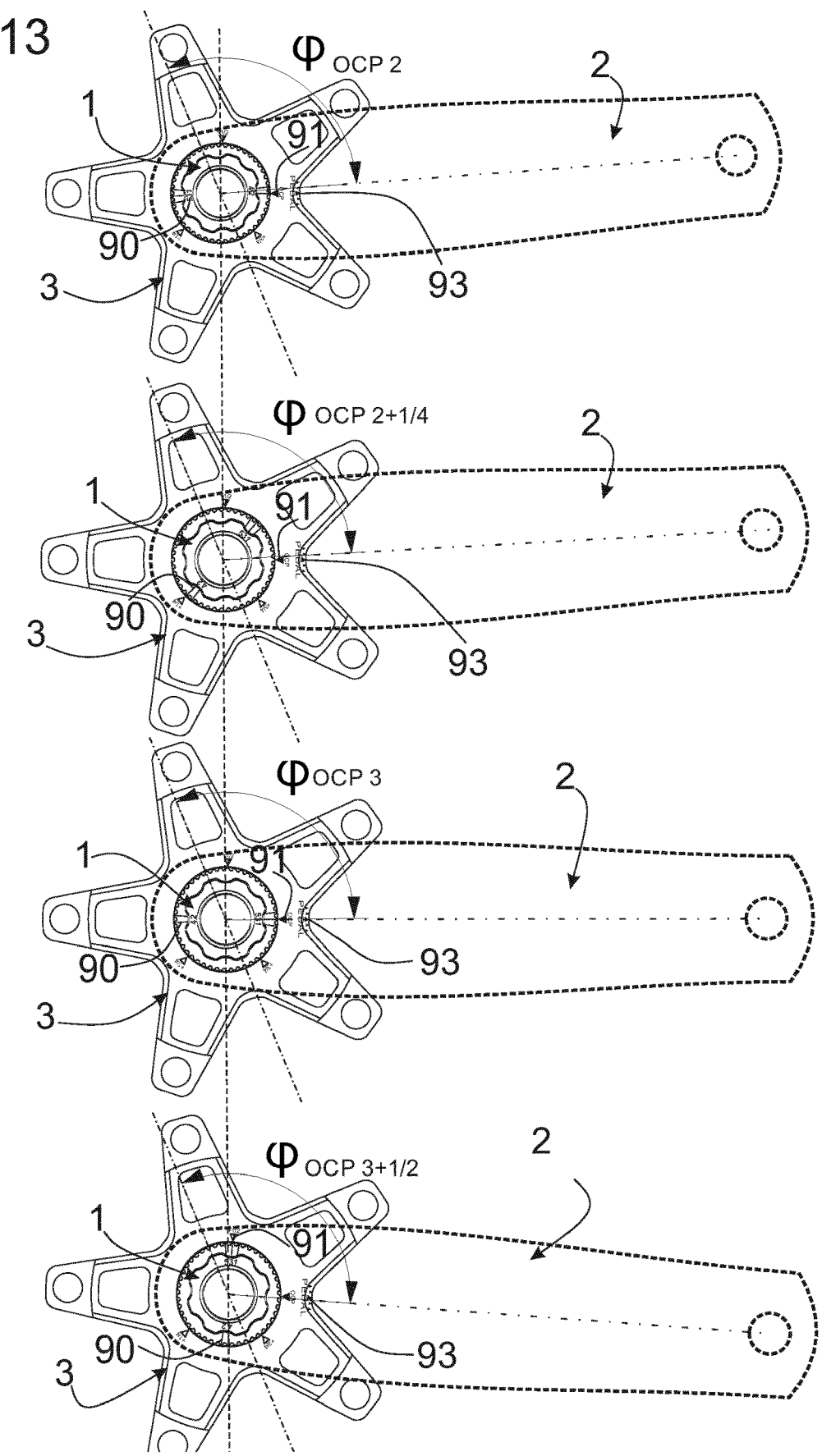
FIG. 13 shows in a transmission element (3) configured as a spider provided whit anchorage points (32) for attaching an ovoid toothed chainring, different angular orientations (φ) corresponding to different OCP positions, in which the right crank (2), the shaft (1) and the transmission element (3) are engaged in different configurations of the torque transmission profiles.
Figure 14:
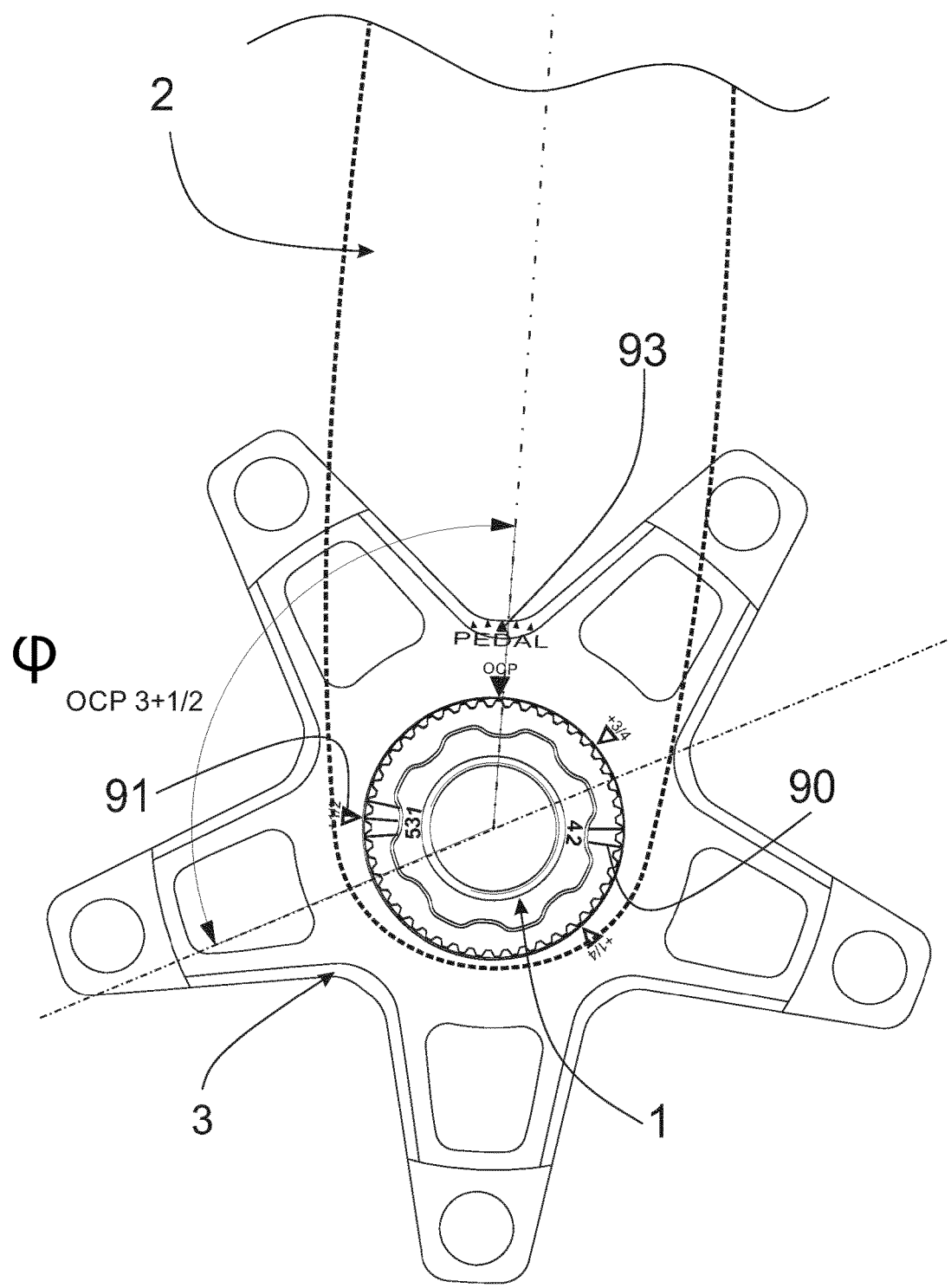
FIG. 14 shows a detail of the crank assembly of FIG. 13 in the particular position OCP3+½ for better visualization of the elements and their marks.

An alternative embodiment of the present invention, shown in FIG. 5 is a bicycle crank assembly with adjustment orientation system for ovoid toothed chainrings, wherein the transmission element (3) comprises one or more ovoid toothed chainrings (310) for engaging with the bicycle chain, integrally configured in a single piece with said transmission element (3).

In an alternative embodiment of the bicycle crank assembly with adjustment orientation system for ovoid toothed chainrings of the invention, the Nt value which corresponds to the different relative angular positions between the right crank (2) and the transmission element (3), is greater than or equal to 45, preferably greater than or equal to 90, and most preferably greater than or equal to 180.

In an alternative embodiment of the present invention, at least one of the torque transmission profiles is configured in a different support member separated from the cranks, from the shaft and from the transmission element, instead of being integrally formed with one of them, wherein some or all said torque transmission profiles may be configured in this way.

Thus, in another alternative embodiment, a first support member, coaxial with the shaft (1), is coupled to the first end portion (12) of the shat (1) in its axially adjacent portion to the projecting member (13). This first support member is provided in its outer peripheral area with the first torque transmission profile (120) for non-rotational engaging with the right crank (2) by means of the fifth torque transmission profile (211).

Similarly, a second support member, coaxial with the shaft (1), is coupled to the first end portion (12) of the shaft (1). This second support member is provided in its outer peripheral area with the second torque transmitting profile (121) for non-rotational engaging with the transmission element (3) by means of the fourth torque transmission profile (301).

In another embodiment the first and second support members can be configured in a single element or in two different elements.

Thus, in a further alternative embodiment, a third support member coaxial with the shaft (1), is coupled to the second end portion (14) of the shaft (1). This third support member is provided in its outer peripheral area with the third torque transmitting profile (141) for non-rotational engaging with the left crank (4) by means of the sixth torque transmission profile (411).

In a further alternative embodiment, the transmission element (3) is coupled in its first coupling portion (30) to a fourth support member coaxial with the shaft (1) and provided in its peripheral area with the fourth torque transmitting profile (301) for non-rotational engaging with the shaft (1), by means of the second torque transmission profile (121).

In another alternative embodiment, the right crank (2) is coupled in its second coupling portion (21) to a fifth support member coaxial with the shaft (1) and provided in its peripheral area with the fifth torque transmission profile (211) for non-rotational engaging with the shaft (1), by means of the first torque transmission profile (120).

In a further alternative embodiment, the left crank (4) is coupled in its third coupling portion (41) to a sixth support member coaxial with the shaft (1) and provided in its peripheral area with the sixth torque transmission profile (411) for non-rotational engaging with the shaft (1), by means of the third torque transmission profile (141).

Finally, in another alternative embodiment of the invention, the transmission element (3) further comprises verification marks (94) which are visible in the mounting position of the crank assembly, so the user can verify with this verification marks (94) once all the elements are engaged, what is the OCP angular position and the value of the <p parameter in which the assembly is mounted, since the aforementioned primary marks (90), secondary marks (91) and reference marks (93) are partially hidden when the assembly is mounted and some elements become overlapped when engaging with others.

While the above is a description of several embodiments of the present invention, other modifications may be arranged without coming out from the scope of the present invention as defined by the following claims. For example, the size, shape, location, or orientation of the different components can be changed as desired. Components which are shown directly connected or in contact with each other may have intermediate structures disposed there between. The functions of an element can be performed by two elements, and vice versa. Therefore, the scope of the invention should not be limited by the specific embodiments described.

The invention claimed is:

1. A bicycle crank assembly with adjustment orientation system for ovoid toothed chainrings, comprising:
a shaft (1) comprising a first end portion (12), a second end portion (14), and a central body (10) located between the first and second end portions, said central body (10) arranged to be rotatably supported in a bottom bracket (33) in a bicycle frame (18); wherein said central body (10), in an adjacent portion to the first end portion (12), comprises a projecting member (13) that extends radially outwardly; wherein said first end portion (12), in an axially adjacent portion to said projecting member (13), comprises a first torque transmission profile (120); wherein said first end portion (12) further comprises a second torque transmission profile (121); and wherein said second end portion (14) comprises a third torque transmitting profile (141);
a transmission element (3), for incorporating at least one toothed chainring for driving a chain, comprising a first coupling portion (30) including a first opening (300) provided with a fourth transmission profile (301) to non-rotatably engage with the first torque transmission profile (120) of the shaft (1);
a right crank (2) corresponding to a drive side comprising at one end (20) a second coupling portion (21) provided with a fifth torque transmission profile (211) which is non-rotatably engaged with the second torque transmitting profile (121) of the shaft (1);
a left crank (4) corresponding to a non-drive side, comprising at one end (40) a third coupling portion (41) provided with a sixth torque transmission profile (411) which is non-rotatably engaged with the third torque transmitting profile (141) of the shaft (1);
wherein the first, second, third, fourth, fifth and sixth torque transmission profiles (120, 121, 141, 301, 211, 411) are geometrically configured as patterns circularly and outwardly arranged and coaxial with a rotation axis of the shaft (1) which is also coincident with a rotation axis of both the right (2) and the left (4) crank and also with a rotation axis of the transmission element (3);
wherein the first and fourth torque transmission profiles (120, 301) when engaging define, in a coupling position between the transmission element (3) and the shaft (1), N1 angular positions equally spaced along 360°;
wherein the second and fifth torque transmission profiles (121, 211) when engaging define, in a coupling position between the right crank (2) and the shaft (1), N2 angular positions equally spaced along 360°;
wherein the third and sixth torque transmission profiles (141, 411) when engaging define, in a coupling position between the left crank (4) and the shaft (1), N3 angular positions equally spaced along 360°;
wherein combining the N2 angular positions provided by the coupling between the right crank (2) and the shaft (1) with the N1 angular positions provided by the coupling between the transmission element (3) and the shaft (1), Nt relative angular positions between the right crank (2) and the transmission element (3) are obtained, an Nt value being the least common multiple of the N1 angular positions and the N2 angular positions; wherein the Nt value is greater than or equal to 45; and
wherein the bicycle crank assembly comprises primary marks (90) arranged on the shaft (1), secondary marks (91) arranged on the transmission element (3), and reference marks (93) also arranged on the transmission element (3), so when combining the primary, secondary and reference marks, an angular graduation system is generated allowing a user to define a desired angular orientation (φ) firstly aligning the secondary marks (91) with the primary marks (90) corresponding to the desired angular orientation engaging the first torque transmission profile (120) with the fourth torque transmission profile (301), and secondly aligning a direction of the longitudinal axis of the right crank (2) with the reference marks (93) engaging the fifth torque transmission profile (211) with the second torque transmission profile (121).

2. A bicycle crank assembly with adjustment orientation system for ovoid toothed chainrings according to claim 1, wherein the Nt angular positions is greater than the N1 angular positions and greater than the N2 angular positions.

3. A bicycle crank assembly with adjustment orientation system for ovoid toothed chainrings according to claim 2, wherein the Nt angular positions is greater than or equal to 90.

4. A bicycle crank assembly with adjustment orientation system for ovoid toothed chainrings according to claim 3, wherein the Nt angular positions is greater than or equal to 180.

5. A bicycle crank assembly with adjustment orientation system for ovoid toothed chainrings according to claim 4, wherein the Nt angular positions is equal to 360, and there are eight N2 angular positions with each N1 angular position being equal to 45.

6. A bicycle crank assembly with adjustment orientation system for ovoid toothed chainrings according to claim 1, wherein the transmission element (3) further comprises a first side surface (302) configured to lean on a lateral surface (212) of the right crank (2), avoiding an axial displacement of said right crank (2) towards the second end portion (14) of the shaft (1).

7. A bicycle crank assembly with adjustment orientation system for ovoid toothed chainrings according to claim 1, wherein the projecting member (13) of the shaft (1) comprises a first axial attachment member (131) which restricts an axial displacement of the shaft (1) into the bottom bracket (33) in a direction toward the second end portion (14) of the shaft (1).

8. A bicycle crank assembly with adjustment orientation system for ovoid toothed chainrings according to claim 7, wherein the projecting member (13) of the shaft (1) comprises a second axial attachment member (130) which leans against a second side surface (303) of the transmission element (3) to avoid an axial displacement towards the second end portion (14) of the shaft (1).

9. A bicycle crank assembly with adjustment orientation system for ovoid toothed chainrings according to claim 1, wherein the first torque transmission profile (120) of the shaft (1) is axially configured by means of N1 radial protrusions and recesses arranged outwardly at a periphery of the shaft for engaging with the corresponding fourth torque transmission profile (301), configured on an inner perimeter surface of the first opening (300) provided in the first coupling portion (30) of the transmission element (3).

10. A bicycle crank assembly with adjustment orientation system for ovoid toothed chainrings according to claim 1, wherein the second torque transmission profile (121) of the shaft (1) is axially configured by means of N2 radial protrusions and recesses arranged outwardly at a periphery of the shaft for engaging with the corresponding fifth torque transmission profile (211) configured on an inner perimeter surface of the second opening (200) provided in the second coupling portion (21) of the right crank (2).

11. A bicycle crank assembly with adjustment orientation system for ovoid toothed chainrings according to claim 1, the at least one toothed chainring is configured in a single piece with said transmission element (3).

12. A bicycle crank assembly with adjustment orientation system for ovoid toothed chainrings according to claim 1, wherein the transmission element (3) comprises an output coupling portion (31) for non-rotatably coupling with the at least one toothed chainring (310), the at least one toothed chainring being configured in a different piece apart from said transmission element (3), the at least one toothed chainring is attached to the transmission element by fasteners (34).

* * * * *